United States Patent [19]

Rhodes et al.

[11] 3,716,373

[45] Feb. 13, 1973

[54] PROCESS FOR AGGLOMERATING INSTANT COFFEE

[76] Inventors: David Rhodes, 1 Heron Way, Broughton Park; Derek Watridge, 22 Deep Dene Avenue, Dorking, both of England

[22] Filed: Nov. 20, 1970

[21] Appl. No.: 91,597

[52] U.S. Cl............................99/71, 99/DIG. 4, 23/313, 264/117
[51] Int. Cl..................................................A23f 1/08
[58] Field of Search..............99/DIG. 4, 71, 65, 199; 23/313; 264/117

[56] References Cited

UNITED STATES PATENTS

| | | | |
|---|---|---|---|
| 3,212,908 | 10/1965 | Childs et al. | 99/DIG. 4 |
| 3,485,637 | 12/1969 | Adler et al. | 99/DIG. 4 |
| 3,424,589 | 1/1969 | Kan et al. | 99/DIG. 4 |
| 3,143,428 | 8/1964 | Reimers et al. | 99/DIG. 4 |

*Primary Examiner*—Tim R. Miles
*Assistant Examiner*—William L. Mentlik
*Attorney*—Bruno P. Struzzi, Thomas V. Sullivan and Gerald E. Jacobs

[57] ABSTRACT

An improved process for agglomerating soluble coffee powder has been discovered which produces agglomerates having a pleasing light color, good mechanical strength and a granular appearance. The coffee particles are compacted and form desired clusters on release from a feed box to the steam jets.

4 Claims, No Drawings

PROCESS FOR AGGLOMERATING INSTANT COFFEE

BACKGROUND OF THE DISCLOSURE

The process of the present invention is an improvement in the fusion-agglomeration process described and claimed in British Patent specification No. 1,111,366.

This invention relates to an instant coffee composition and to a process for the production of such a composition. More particularly, the invention relates to the production of an agglomerated coffee composition having a different and more desirable physical appearance than the materials at present available.

Powdered coffee has been agglomerated by a basic technique which has been described in U. S. Pat. specification No. 2,977,203. This Specification discloses forming the powder to be agglomerated as particles moving in a plane in a first direction, wetting the particles by the action of a jet of steam, the path of which substantially coincides with the plane of the particles, the direction of the jet being disposed at a substantial angle to the direction of movement of the particles, the jet of steam having sufficient force to redirect the particles in the plane and project them while in the plane in the path of travel of the steam whereby wetted particles are caused to contact one another and agglomerate.

Subsequent developments of the process to produce a dried and fused instant coffee agglomerate of good mechanical strength are described and claimed in British Patent specifications Nos. 1,111,365 and 1,111,366. The term "fusion" as used herein means melting, welding, cementing or coalescing of the surfaces of the various coffee particles at the points of contact of these particles by raising the temperature of the particles to above the temperature at which they become plastic. In the presence of the moisture supplied by the steam used, such fusion occurs at a lower temperature than would otherwise be the case and the coffee is not degraded due to the application of heat. It is believed that particles of coffee agglomerate when fused areas on the surface of the particles are brought into contact and the bonds formed are those of melted coffee solids.

It has been appreciated that in the operation of the above prior processes several factors are operative in determining the nature of the product which may vary from a fluffy agglomerate which is easily broken down to a strong fused coffee agglomerate having a more granular appearance.

For example, British specification No. 1,111,366 describes the formation of dark-colored agglomerates by the use of additional techniques of milling spray-dried coffee powder to a fine particle size, preconditioning this material by cooling before subjecting it to the fusion-agglomeration process. However, the appearance of the product has left much to be desired, for example, typical products have been dark brown in color.

SUMMARY

It is an object of the present invention to provide an agglomerated powdered coffee composition which is both granular in appearance and of a pleasing light color and of good mechanical strength.

According to the present invention there is provided an instant coffee composition which comprises a free-flowing, soluble, agglomerated powder normally having a bulk density of 0.25 to 0.40 gm./cc., having a particle size distribution such that at least 50 percent by weight of the particles are greater than 18 mesh (British Standard), having a color of 28 to 40 Lumetron units, the agglomerated particles being dense granular chips with substantially regular faces. Normally, substantially all the particles are greater than 36 mesh.

The color of the coffee compositions is herein quantified in so-called Lumetron units, which are a measure of the reflectance color of the powder or agglomerated powder from a tri-stimulus light source. For this purpose, the powder is placed in a small flat dish and measurements are taken by a Photovolt Reflection Meter (manufactured by the Photovolt Corporation of New York, U.S.A., and used as described in their brochure). Although the meter is already calibrated in arbitrary Lumetron units, it is necessary to have a reference color measurement based on prepared colored surfaces. Thus, for the purposes of interpreting the figures quoted herein, commercial spray-dried instant coffee powders normally available in the United Kingdom have a Lumetron value of 28 to 32 units (light-colored) whereas "Espresso" type spray-dried coffee powders have a Lumetron Value of 20 to 22 units (dark-colored) at similar particle sizes.

The invention also provides a process for the production of an instant coffee composition in the form of a free-flowing, soluble, agglomerated powder, which process comprises forming milled soluble coffee particles into clusters, preferably by feeding the milled particles into a vibrating distributor box, as hereinafter described, and maintaining sufficient depth of particles in the box so that the particles are substantially compacted and form the desired clusters on release from the box, feeding the resulting clusters into a zone where they are moistened and heated, preferably by steam containing a high proportion of water, subjecting the moistened clusters to turbulence whereby they form an agglomerated granular powder and drying the resulting powder.

The present invention is based upon the unexpected finding that if milled soluble powdered coffee is first formed into localized concentrations or clusters of particles and such concentrations or clusters are then wetted with steam and are subjected to slight turbulence in the presence of steam, a different kind of agglomerate is formed. This agglomerate is then passed through a hot drying zone during which excess moisture is removed. When cooled the product is of a light color. The product retains the flavor of the initial soluble coffee.

DETAILED DESCRIPTION

In carrying out the process of this invention particles of milled coffee are compacted by feeding the particles into a vibrating feed box operated in such a manner that the coffee particles held therein are essentially released in the form of clusters of particles. The bottom of the box is provided with slits which are long relative to their width, e.g., having a length 15 to 30 times the width. A suitable width is one-eighth inch but widths somewhat greater or less than this may be used. The box is provided with a vibrator which is only started up after a supply of powdered soluble coffee has first been fed in. The rate of vibration and of feeding in further material are then co-related so as to maintain in the box a layer of substantially compacted milled powder, e.g., a layer 1 inch thick. In order to achieve this result with the type of box used in the known agglomerating process as described in British specification No. 1,111,366, a reduced amplitude of vibration is used. Using the same box there is thus a reduction in throughput.

In the present process it is preferred to use a milled powder in which 50% of the milled particles are under 25 microns in diameter.

The milled powder is preferably fed into the box at a temperature of 80° to 110° F., but lower temperatures, e.g., 40° F. may be used if desired.

As the clusters of particles enter the steam laden zone the outermost particles appear to be acted upon by the steam with the result that when fusion takes place it appears to be limited to the outermost particles of each cluster which appear to enclose a number of substantially unfused particles in the center thereof.

In the process of the present invention, the quantity of steam used in relation to actual milled coffee powder is substantially in the same ratio 1:1 or 3/4:1 as that described in British specification No. 1,111,366, but the actual velocity of the steam from the jets is less, particularly that from the lower set of jets. The initial moisture content of the material used in this process is about 3 percent.

After passing through the hot drying zone the product is cooled by means of a current of cool air and is then sieved to remove any undersized particles.

When viewed under the microscope the product of the present invention is seen to have a structure which is different both from that of a conventional agglomerated soluble coffee and from a freeze-dried product. The individual agglomerates appear to consist of an outer shell of solidified liquid coffee particles, which shell surrounds a kernel of discrete particles of coffee powder which appear not to have undergone any change but are closely packed within the shell. The golden brown color of the agglomerates appears to be due to reflectance from the surfaces of the particles which form the kernels of the agglomerates. In general, the outer shell is more than one layer of particles in thickness. This may be compared with a conventional agglomerated product which consists of a matrix of particles irregularly linked up and which usually contains voids. The closer packing in the agglomerates of the present invention is consistent with the higher bulk density which has been observed.

The following Example illustrates the process of the invention

A spray-dried instant coffee powder was prepared having a particles size distribution of between 100 and 800 microns, a density of 0.18 gm./cc., and a moisture content of 3 percent. This powder was milled in a hammer mill equipped with an 80 mesh sieve screen. The product passing the screen was found to comprise 95 percent by weight of particles having a particle size distribution of between 2 and 100 microns with 50 percent by weight of the particles being under 25 microns. The milled powder had a moisture content of 3 percent by weight and a density of 0.5 gm./cc.

This milled powder was next agglomerated using an apparatus substantially as described in British Patent specification No. 1,111,366. The powder was fed from a chute into a vibrating distributor box having an internal length of 12 inches, an internal width of 4 inches and a depth of 5.75 inches. The bottom of the box contained a plurality of substantially parallel slots each 2.5 inches long and 0.125 inches wide, spaced 0.375 in from each other. The box was fitted with a vibrator of the Syntron type, model V.15. The milled powder was fed into the box to produce a layer of powder of between 1 and 2 inches thick before the vibrator was started up. Additional powder was then fed into the vibrating box at the rate of substantially 250 lbs. per hour. Under these conditions the powder in the box assumed a substantially compacted condition and by suitably adjusting the amplitude of vibration, the powder emerged from the slots in clusters of particles. The milled powder was introduced into the box at a temperature of from 80° to 100° F.

The clusters falling from the bottom of the box fell into the path of a plurality of steam jets. The steam was supplied at a rate of 120 pounds per hour to an upper set of nozzles and a rate of 210 pounds per hour to a lower set of nozzles.

Located beneath the lower set of steam jets was the entrance to a drier into which the agglomerated product fell. In this drier, which had a height of 20 feet and a diameter of 8 feet, air preheated to 485° F. was introduced travelling in the same direction as the falling agglomerated particles. The temperature of the air leaving the bottom of the drier was 270° F.

The dried agglomerates now having a temperature of 180° F. fell on to a vibrating conveyor through which cold air was passed, thus cooling the agglomerates which were then screened. The particle size distribution of the product was determined to be between 7 and 36 mesh (British Standard), with about 50 percent by weight being greater than 18 mesh. Agglomerated material which passed a 36 mesh British Standard screen was recycled to the hammer mill and the remainder taken as the product. This product was designated Product A.

Comparative Run (see British Patent specification No. 1,111,366)

For the purposes of comparison a run was carried out in which similar spray-dried instant coffee powder was milled in a similar hammer mill and the powder chilled by the admission of liquid carbon dioxide so that the emergent powder had a temperature of 40° F. This powder was fed into the distributor box described above which was, however, vibrated so that the powder fell freely from the slots as soon as received in the box from the chute and thus without first assuming a substantially compacted condition. Under these conditions some 800 lbs. per hour of product was fed through the box and the total steam delivered was at the rate of 500 pounds per hour. The product was dried in the same drier as in the run previously described using an increased air flow. In this case the inlet temperature of the air was 450° F. and the outlet temperature 270° F. The product was screened in the same way as that described above. This product was designated Product B.

The properties of the two products were as follows:

| Property | Product A | Product B |
| --- | --- | --- |
| Free Flowing Bulk Density | 0.28 gm./cc. | 0.20 gm./cc. |
| Color (Lumetron units) | 32 (light golden brown) | 21 (dark brown) |
| Appearance | dense granular chips with regular faces | irregular honeycomb-like structure |

What is claimed is:

1. A process of agglomerating instant coffee comprising feeding milled instant coffee particles into a vibrating feed box, controlling the depth of particles in the feed box to at least 1 inch and the degree of vibration sufficient to compact and form clusters of particles at the discharge of the feed box, feeding the clusters by free-fall into a turbulent steam vapor zone where they are moistened and heated forming agglomerates of coffee powder and drying the resulting agglomerates; thereby obtaining agglomerated particles having a density of from 0.2 to 0.4 gm/cc and a particle size distribution such that at least 50 percent by weight of the particles are greater than 18 mesh, the agglomerated particles being granular chips with substantially regular faces.

2. The process of claim 1 wherein steam containing a high proportion of water is used to moisten and heat the clusters.

3. The process of claim 2 wherein at least 50 percent of the milled particles are less than 25 microns in diameter.

4. The process of claim 3 wherein the temperature of the ground particles is from 80° to 110° F.

* * * * *